(12) United States Patent
Cam-Winget et al.

(10) Patent No.: US 7,903,817 B2
(45) Date of Patent: Mar. 8, 2011

(54) SYSTEM AND METHOD FOR WIRELESS NETWORK PROFILE PROVISIONING

(75) Inventors: Nancy Cam-Winget, Mountain View, CA (US); Hao Zhou, Solon, OH (US); Bhawani Sapkota, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1314 days.

(21) Appl. No.: 11/366,175

(22) Filed: Mar. 2, 2006

(65) Prior Publication Data

US 2007/0208937 A1 Sep. 6, 2007

(51) Int. Cl.
*H04K 1/00* (2006.01)
(52) U.S. Cl. ........................................................ 380/270
(58) Field of Classification Search ............... 370/330, 370/338, 401; 380/270, 271, 229; 726/27; 713/168
See application file for complete search history.

(56) References Cited

U.S. PATENT DOCUMENTS

| 7,161,909 B2 * | 1/2007 | Sharma | 370/235 |
| 7,164,915 B2 * | 1/2007 | Zaki | 455/436 |
| 7,174,564 B1 * | 2/2007 | Weatherspoon et al. | 726/2 |
| 7,515,569 B2 * | 4/2009 | Prasad | 370/338 |
| 2002/0009199 A1 * | 1/2002 | Ala-Laurila et al. | 380/247 |
| 2002/0013784 A1 * | 1/2002 | Swanson | 707/104.1 |
| 2002/0159421 A1 * | 10/2002 | Tanimoto et al. | 370/338 |
| 2002/0176579 A1 * | 11/2002 | Deshpande et al. | 380/270 |
| 2004/0078598 A1 * | 4/2004 | Barber et al. | 713/201 |
| 2004/0203593 A1 | 10/2004 | Whelan et al. | |
| 2004/0225728 A1 * | 11/2004 | Huggins et al. | 709/223 |
| 2005/0265531 A1 * | 12/2005 | Mika | 379/201.01 |
| 2006/0164978 A1 | 7/2006 | Werner et al. | |
| 2006/0164986 A1 * | 7/2006 | Rinne | 370/231 |
| 2006/0291413 A1 * | 12/2006 | Rossier et al. | 370/329 |
| 2007/0049252 A1 * | 3/2007 | Smith et al. | 455/411 |
| 2007/0208937 A1 * | 9/2007 | Cam-Winget et al. | 713/168 |

OTHER PUBLICATIONS

Elio Perez, Aug. 21, 2004, SANS Institute InfoSec Reading Room, GSEC Certification, Version 1.4b Option 1, "802.11(i) How we got here and where are we headed", pp. 1-24.*
PCT International Search Report, International Application No. PCT/US07/62278, Dec. 21, 2007.
"The Cable Guy" Wireless Provisioning Services Overview; Dec. 2003, Updated Mar. 31, 2005; www.microsoft.com.

* cited by examiner

*Primary Examiner* — Benjamin E Lanier
*Assistant Examiner* — Cordelia Zecher
(74) *Attorney, Agent, or Firm* — Tucker Ellis & West LLP (57) ABSTRACT

A system and method to enable an access point to dynamically provision a WLAN client with a new wireless profile once an association is established based on the infrastructure policy. A client can be directed to use a new profile without the need for pre-configuration and going through another authentication process. The new wireless profile can be provided to the client either during or after association, with or without the protection of link layer security key.

20 Claims, 11 Drawing Sheets

SYSTEM AND METHOD FOR WIRELESS NETWORK PROFILE PROVISIONING

BACKGROUND OF THE INVENTION

The present invention relates generally to Wireless Local Area Network (WLAN) and more specifically to a system and method that allow a WLAN to provide a wireless client with alternate profiles.

Currently, to establish an EEE 802.11 wireless LAN connection, some configuration of the client devices is expected; for instance, the client may be configured to use specific SSID(s) (Service Set Identifiers), power settings, security properties and QoS (Quality of Service) parameters to name a few. Specifically, when a resource requests such as authorization and QoS occur, there may be instances when a client may need to be dynamically configured and switched to use a specific 802.11 profile. For instance, with IEEE 802.1X user authentication and Cisco Network Admission Control (NAC), WLAN clients are likely to be put on different Virtual LANs (VLANs) based on their user credentials and/or posture. Another example is that based on the applications used by the WLAN client; it may need to be placed on a different SSID and VLAN if it is using a voice or video application. Each VLAN typically has its own security profile including a unique key and protection mechanism (e.g. TKIP, AES-CCMP, etc) to ensure its broadcast and multicast streams are protected.

Under the current IEEE 802.11 protocol, if a client's resource request such as SSID, security or bandwidth allocation does not match its authorization policy, the client may be disassociated or deauthenticated causing the disruption of service to the client. Furthermore, there is no mechanism for the client to discover permitted wireless network access parameters, other than the given deauthentication/disassociation status code, for the disruption of service. Existing IEEE 802.11 management frames only facilitate disassociation/deauthentication with generic and vague error codes such as previous authentication is no longer valid, but there exists no mechanism for an Access Point (AP) to transmit new wireless network access parameters. Clients currently rely on manual pre-configuration and trials of auto profile switching to land on the correct profiles. Even if the correct profile is finally being used, the client must still go through the authentication process again to get the link layer encryption key, as the keys generated during the previous association were not kept and used.

BRIEF SUMMARY OF THE INVENTION

In accordance with an aspect of the present invention, there is described herein a system and method to enable an access point to dynamically provision a client with a new wireless profile once an association is established. A client can be directed to use the new profile without the need for pre-configuration or going through another authentication process.

In accordance with an aspect of the present invention, there is described herein a method for updating a client profile. The method comprises associating the client with an access point, using a current profile. The method further comprising provisioning the client with an alternate profile and receiving an acknowledgement from the client verifying receipt of the alternate profile.

In accordance with an aspect of the present invention, there is described herein a system, comprising a wireless client having a current profile, an access point operable for wirelessly communicating with the wireless client, an authentication server coupled to the access point by a distribution network operable for authenticating the wireless client for the access point and a profile server coupled to the access point by the distribution network and operable to provide the access point with data representative of profile data for the wireless client. The access point is responsive to associating the client. The access point is operable to communicate with the authentication server to optionally authenticate the wireless client identity. The access point is operable to communicate with the profile server and receive an alternate profile for the wireless client. The access point is responsive to receiving the alternate profile and to sending the alternate profile to the wireless client. Furthermore, the access point is responsive to receiving an acknowledgement from the client verifying receipt of the alternate profile.

In accordance with an aspect of the present invention, there is described herein an access point comprising a wireless transceiver operable to sending and receiving wireless signals. The access point has means for associating with a client coupled to the wireless transceiver, the client having a current profile, means for provisioning the client with an alternate profile coupled to the wireless transceiver and means for receiving an acknowledgement from the client verifying receipt of the alternate profile coupled to the wireless transceiver. The alternate profile includes one of the group consisting of basic service set identifier (BSSID), radio channels, minimum transmit power, maximum transmit power, service set identifier (SSID), unicast cipher, broadcast cipher, Extensible Authentication Protocol (EAP) type, Quality of Service (QoS) profile and traffic specification priorities.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing is and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
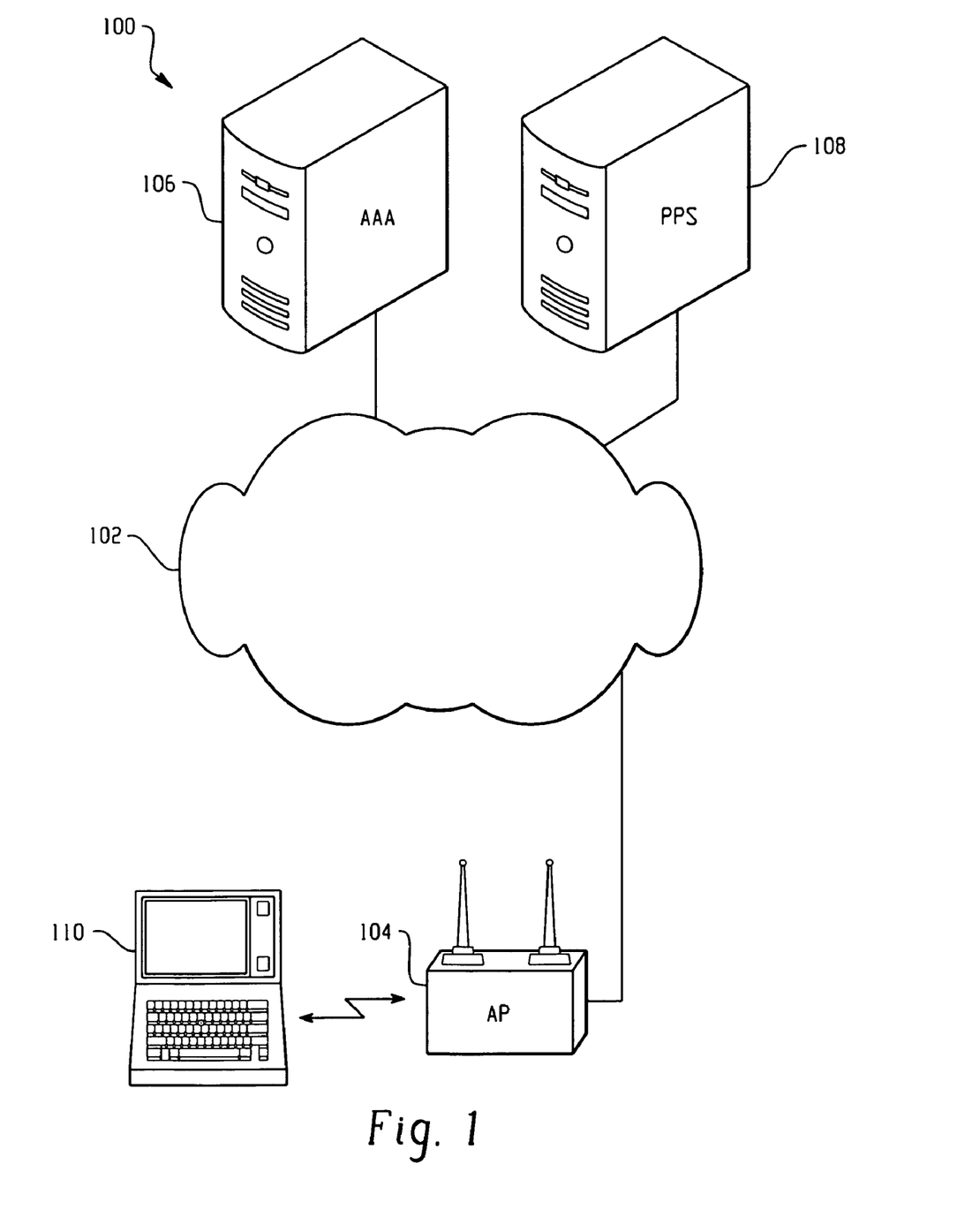
FIG. 1 is a block diagram of a system in accordance with an aspect of the present invention.

Throughout this description, the preferred embodiment and examples shown should be considered as exemplars, rather than limitations, of the present invention. FIG. 1 is a block diagram of a system 100 in accordance with an aspect of the present invention. The system comprises four entities: a station (STA) or wireless client (client) 110, an access point (AP) 104, a AAA (Authentication, Authorization, Accounting) Server 106 and Profile Policy Server (PPS) 108. AP 104 communicates wirelessly with STA 110. AP 104, AAA Server 106 and PPS Server 108 are coupled by distribution network 102. Distribution network 102 is suitably any wired, wireless or combination of wireless and wired network topology. Although as illustrated AAA Server 106 and PPS Server 108 are coupled together by distribution network 102, those skilled in the art should readily appreciate that AAA Server 106 and PPS Server 108 can also be co-located.

Station (STA) 110 is a wireless client that needs a network connection. STA 110 is usually pre-configured with a current wireless network profile and uses it to connect with AP 104.

Access Point (AP) 104 provides a network connection to STA 110. AP 104 may work with the AAA 106 and Profile Policy Sever 108 to determine the appropriate wireless network profile for the STA 110.

AAA Server 106 provides authentication and authorization of STA 110 and its network access policy to the AP 104. AAA Server 106 communicates with AP 104 via network 102. When STA 110 attempts to associate with AP 104, AP 104 obtains authentication, authorization and network access policy for STA 110 from AAA Server 106.

Profile Policy Server (PPS) 108 validates and provides the wireless network profile for STA 110. Although in FIG. 1 PPS 108 is illustrated as a standalone device, PPS 108 may be co-located with AAA server 106 or AP 104.

AP 104 may provide STA 110 with an alternate wireless network profile once an association is established. A wireless network profile contains network access parameters such as: SSID; BSSID; Radio parameters: channels, minimum/maximum transmit power; Security settings: unicast cipher, broadcast cipher, authenticated key management type, and EAP Type; QoS settings: traffic specification (tspec) priorities; and other application specific settings. AP 104 may provision STA 110 with multiple wireless network profiles with the indication of which one to be used next, and the rest of them to be saved for future use. Moreover, AP 104 may provision STA 110 with a profile (or profiles) multiple times.

In a preferred embodiment, STA 110 completes an association (e.g. an IEEE 802.11 association). During the 802.11 authentication and association, AP 104 determines, either through local policy or by contacting PPS Server 108 whether STA 110 is authorized for the current profile that STA 110 used for association. If STA 110 should be using a different (alternate) profile, AP 104 allows the association to succeed but does not allow any data traffic to pass (i.e. AP 104 maintains STA 110 in a controlled state allowing only packets on the uncontrolled port and blocking packets on the controlled port). The successful association is used to enable AP 104 to provision STA 110 with the required (alternate) profile. AP 104 and/or STA 110 policy determines whether the association persists even if a preferred (alternate) profile is provided. In a preferred embodiment, STA 110 switches to the alternate profile. For example, in a Cisco Network Access Control (NAC) environment (an implementation of which is available from Cisco Systems, 170 West Tasman, San Jose, Calif. 95134) a client (e.g. STA 110) that has been infected must be remediated using different profiles before it can return to its preferred profile.

As an example of an implementation of an aspect of the present invention, STA 110 associates with AP 104. AP 104 determines a profile for STA 110 from PPS 108. If AP 104 determines the current profile for STA 110 does not match the profile received from PPS 108 (alternate profile), AP 104 transmits the alternate profile to STA 110. STA 110 sends an acknowledgement to AP 104 upon receiving the alternate profile.

STA 110 or AP 104 may deauthenticate/disassociate STA 110 so that STA 110 can use the alternate profile. If a BSSID is provided by the alternate profile, STA 110 may scan to join the new BSSID. Similarly, if a SSID is provided by the alternate profile, the client may scan to join the new SSID. Alternatively, STA 110 may chose a BSSID or SSID that best fits the remaining set of radio parameters (e.g., Radio, Security, QoS) if neither a BSSID or SSID is provided.

Optionally, AP 104 may block the controlled port for STA 110 (or put STA 110 into a controlled state) until STA 110 associates using the alternate profile. STA 110 can still use the uncontrolled port to communicate with AP 104.

In accordance with an aspect of the present invention, a preferred embodiment enables STA 110 to receive a second (or even more additional) profiles dynamically. For example, after STA 110 has associated with AP 104 using the alternate profile, either AP 104 or PPS 108 can provide another (second) alternate profile for STA 110. AP 104 transmits the second alternate profile to STA 110. STA 110 responsive to receiving the second alternate profile transmits an acknowledgement to AP 104 verifying receipt of the second alternate profile. Either STA 110 or AP 104 may decide to deauthenticate/disassociate STA 110 to enable STA 110 to associate with the second alternate profile.

In accordance with an aspect of the present invention, an alternative embodiment contemplates that AP 104 establishes a link layer encryption key with STA 110. AP 104 may block the controlled port of STA 110, however, frames between AP 104 and STA 110 are protected by the encryption key. AP 104 encrypts the alternate profile with the key and then sends the alternate profile to STA 110. After STA 110 associates with AP 104 using the alternate profile, STA 110 and AP 104 can mutually derive a new key based on the previously established key or keep using the existing key.

In accordance with an aspect of the present invention, an alternative embodiment contemplates that AP 104 establishes a link layer encryption key with STA 110 using a four-way handshake protocol, such as the IEEE 802.11i four-way handshake. In the four-way handshake implementation, AP 104 sends an anonce to STA 110 in first message. In response to receiving the anonce, STA 110 derives a snonce and sends the snonce to AP 104 in the second message. In the third message, AP 104 sends security parameters to STA 110 and the alternate profile. STA 110 responds with an acknowledgement to AP 104 in the fourth message, verifying receipt of the alternate profile.

In view of the foregoing structural and functional features described above, methodologies in accordance with various aspects of the present invention will be better appreciated with reference to FIGS. 2-9. While, for purposes of simplicity of explanation, the methodologies of FIGS. 2-9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodologies in hardware, software, or a combination thereof. The methodologies described in FIGS. 2-9 are described as implemented on network 100 (FIG. 1); however, this is merely for ease of illustration as those skilled in the art can readily appreciate that the methodologies described in FIGS. 2-9 are suitably adaptable to a variety of networks.

As used herein, the alternate profile can includes, but is not limited to, one or more of the groups consisting of basic service set identifier (BSSID), radio channels, minimum transmit power, maximum transmit power, service set identifier (SSID), unicast cipher, broadcast cipher, Extensible Authentication Protocol (EAP) type, Quality of Service (QoS) profile and traffic specification priorities.

Figure 2:
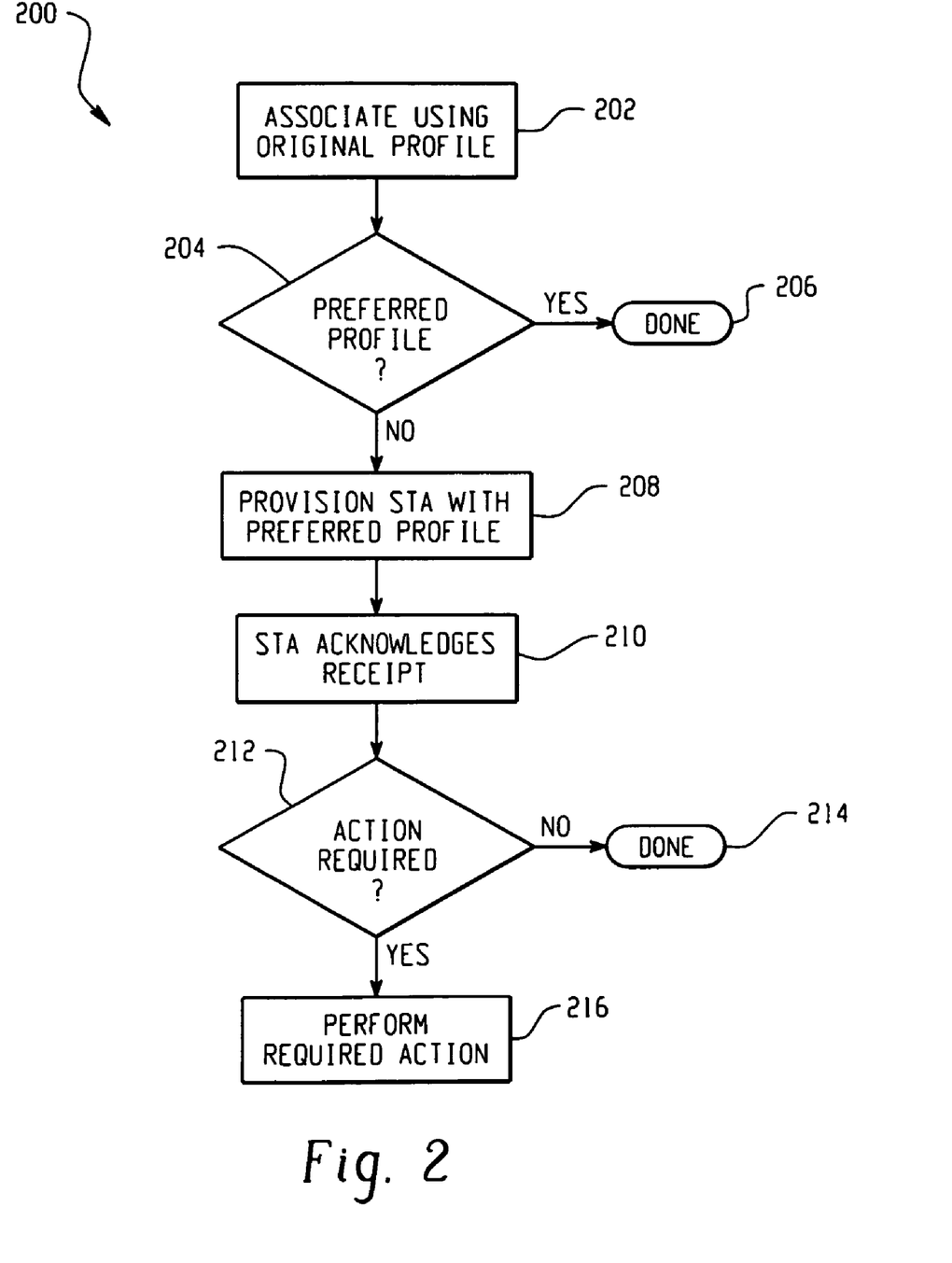
FIG. 2 is a block diagram of a first methodology in accordance with an aspect of the present invention.
Figure 3:
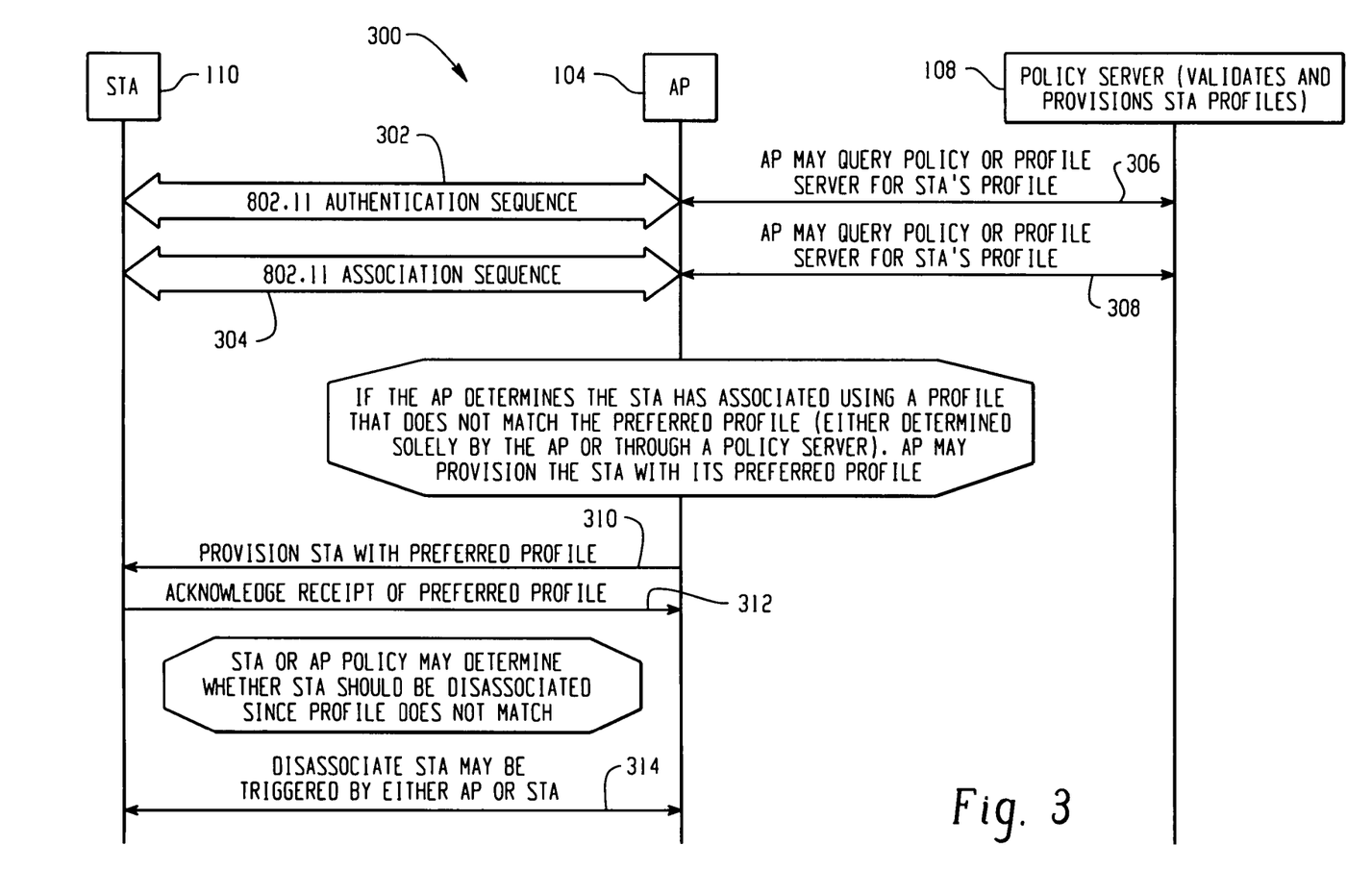
FIG. 3 is a flow diagram illustrating signaling for a system implementing the first methodology.

FIG. 2 is a block diagram of a first methodology 200 in accordance with an aspect of the present invention. FIG. 3 is a flow diagram 300 illustrating signaling for a system implementing first methodology 200. Methodology 200 provisions the client with a new wireless network profile during association when no Layer 2 security is negotiated.

At 202, STA 110 associates with AP 104. STA 110 associates with a current (first) profile. Authentication and association sequences 302, 304 are between STA 110 and AP 104. Responsive to authentication sequences 302, 304, AP 104 may query PPS 108 for a preferred profile for STA 110 as shown by 306, 308 respectively. Alternatively, AP 104 may store profiles locally and query locally stored profiles.

At 204, AP 104 determines whether STA 110 is using the preferred profile. If STA 110 is using the preferred profile (YES) then no further action is necessary and the process stops at 206. STA 110 is given network access by AP 104. If at 204 AP 104 determines that STA 110 does not have the preferred profile (NO) then at 208 STA 110 is provisioned with the preferred (alternate) profile as shown by 310 and an indication that the new alternate profile needs to be used. At 210 STA 110 acknowledges receipt of the preferred profile as shown by 312. At 212 either STA 110 or AP 104 determines whether STA 110 or AP 104 needs to take any additional action. For example, AP 104 can determine whether STA 110 can remain associated with the current profile or if STA 110 should re-associate and/or re-authenticate with the preferred (alternate) profile. Similarly, STA 110 can determine whether it needs to take addition action, such as a re-boot or associate with another AP (not shown) to activate the preferred (alternate) profile. If additional action is desired (YES) at 216 STA 110 or AP 104 performs the additional action (for example as shown by 314); Otherwise, (NO) then method 200 stops at 214 and STA 110 is given network access.

Figure 4:
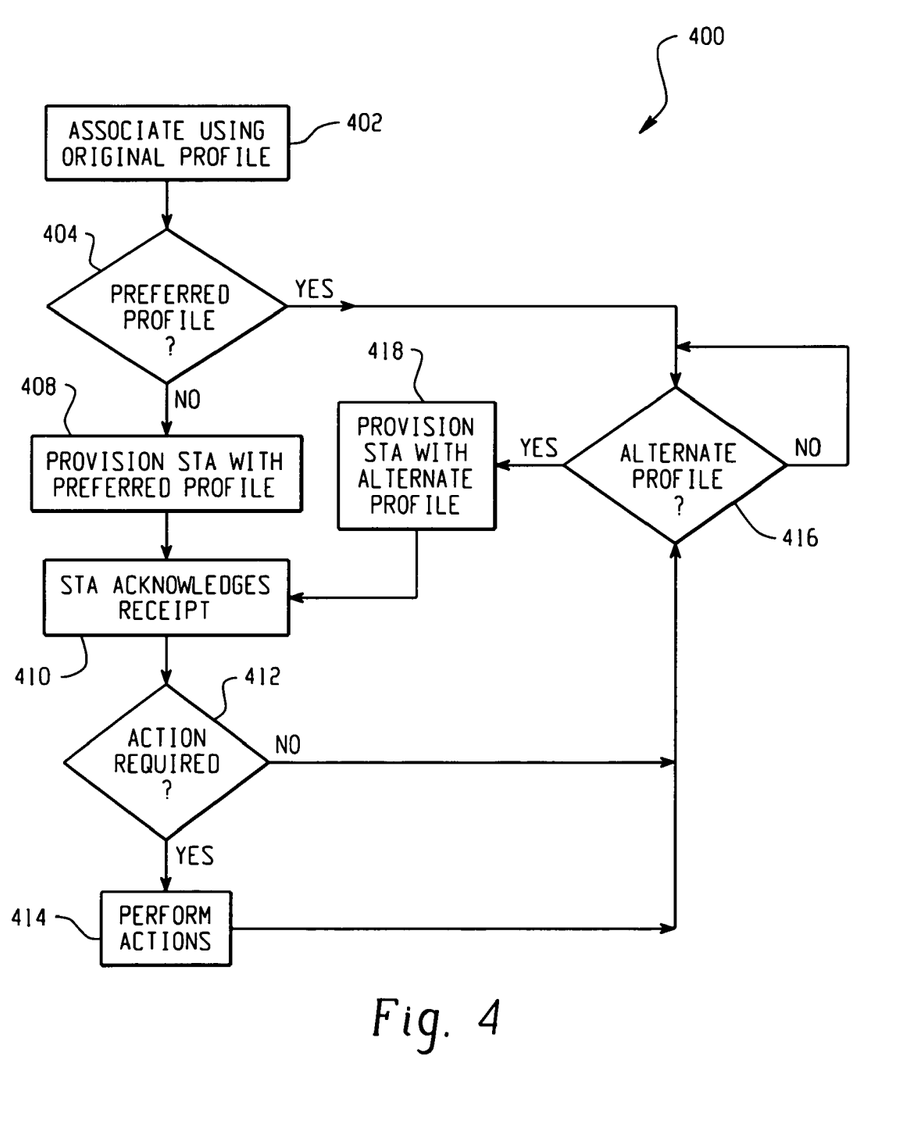
FIG. 4 is a block diagram of a second methodology in accordance with an aspect of the present invention.
Figure 5:
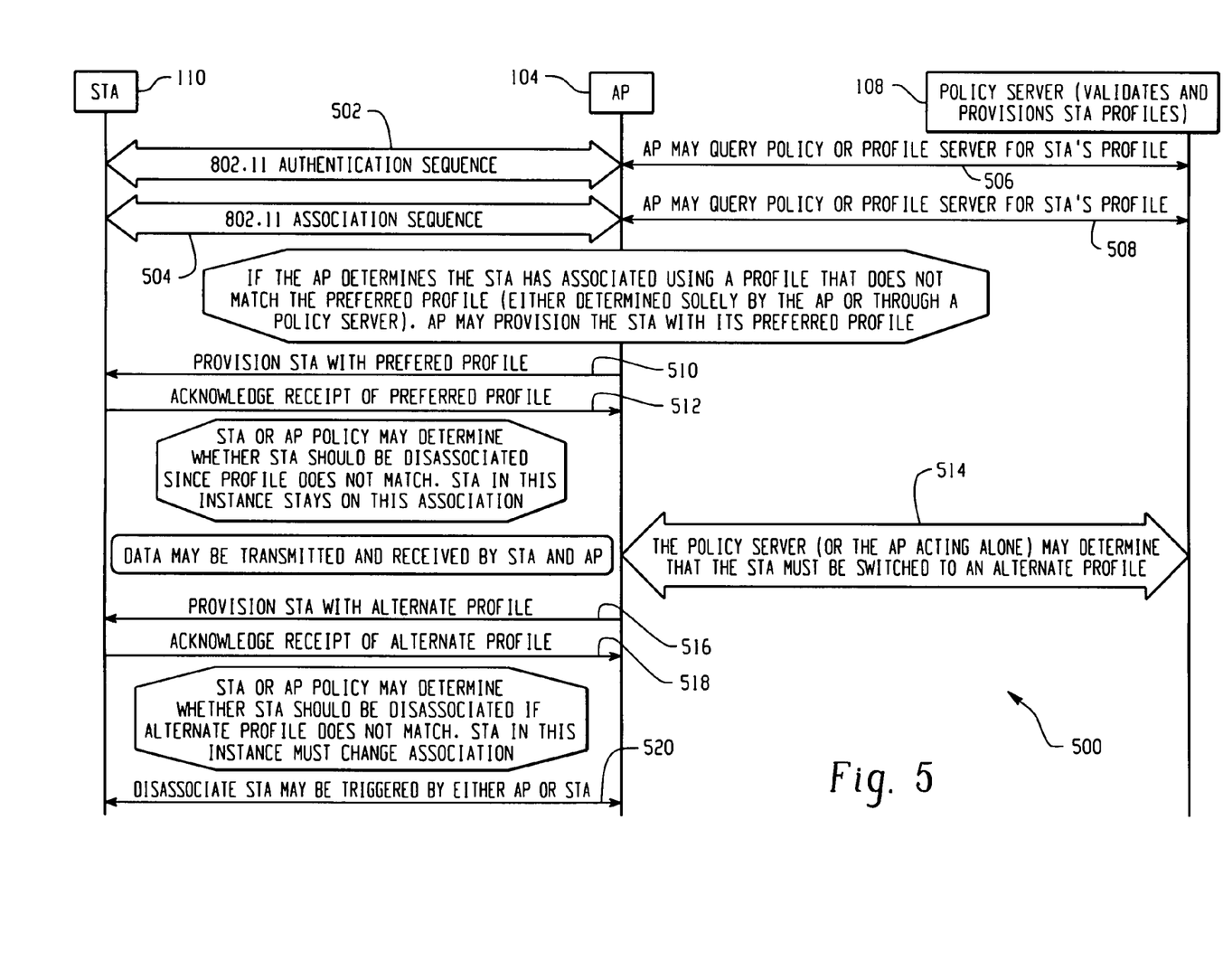
FIG. 5 is a flow diagram illustrating signaling for a system implementing the second methodology.

FIG. 4 is a block diagram of a second methodology 400 in accordance with an aspect of the present invention. FIG. 5 is a flow diagram 500 illustrating signaling for a system implementing the second methodology. Methodology 400 provides dynamic profile provisioning after association has been established and network access has been granted in an insecure channel where no Layer 2 protection is defined. At any time during the active association, AP 104 or PPS 108 may determine that the STA 110 must be switched to an alternate profile. This could be the result of policy change on the back end, e.g., Change of Authorization (CoA), or the result of Layer 3 posture validation or update.

At 402, STA 110 associates with AP 104. STA 110 associates with a current (first) profile. Authentication sequences 502, 504 are between STA 110 and AP 104. Responsive to authentication sequences 502, 504, AP 104 may query PPS 108 for a preferred profile for STA 110 as shown by 506, 508 respectively. Alternatively, AP 104 may store profiles locally and query locally stored profiles.

At 404, AP 104 determines whether STA 110 is using the preferred profile. If STA 110 is using the preferred profile (YES) then no further action is necessary and the processing goes to 416. If at 404 AP 104 determines that STA 110 does not have the preferred profile (NO) then at 408 STA 110 is provisioned with the preferred (alternate) profile as shown by 510. At 410 STA 110 acknowledges receipt of the preferred profile as shown by 518. At 412 either STA 110 or AP 104 determines whether STA 110 or AP 104 should perform any additional actions. For example, AP 104 can determine whether STA 110 can remain associated with the current profile or if STA should re-associate and/or re-authenticate with the preferred (alternate) profile. If additional action is desired (YES) at 414 STA 110 or AP 104 performs the additional action (for example as shown by 520); otherwise (NO) then method 400 proceeds to 416.

At 416, either AP 104 or PPS 108 determines whether STA 110 should be switched to an alternate profile, which is shown by signal 514. If at 416 it is determined that STA 110 should maintain its current profile (NO) then no further action is required. However, if at 416 it is determined that STA 110 should be switched to an alternate profile (YES), at 418 STA 110 is provisioned with the alternate profile as shown by signal 516. At 410, STA 110 acknowledges receipt of the alternate profile as shown by 518. Steps 412 and 416 are repeated as needed (for example if desired STA 110 can deauthenticate/disassociate as shown by 520), and processing returns to 416. If at 416, STA 110 should be switched to yet another alternate profile (YES) then 418, 410, 412 and if desired 414 are executed as was just described. An aspect of the present invention is that steps 418, 410, 412, 414, 416 can be repeated as often as desired. There is no limit to the number of times STA 110 can be provisioned with a new alternate profile (or as mentioned herein supra multiple profiles).

Methodology 400 enables frequent, dynamic updating of profiles. For example, in a Cisco NAC environment, a client that has been infected may be provided with one or more profiles for the client to use for remediation before it can switch back to its standard profile. As another example is if a client initiates an application that requires a different VLAN (such as video) and must be switched to a profile (SSID) that can better service the application.

Figure 6:
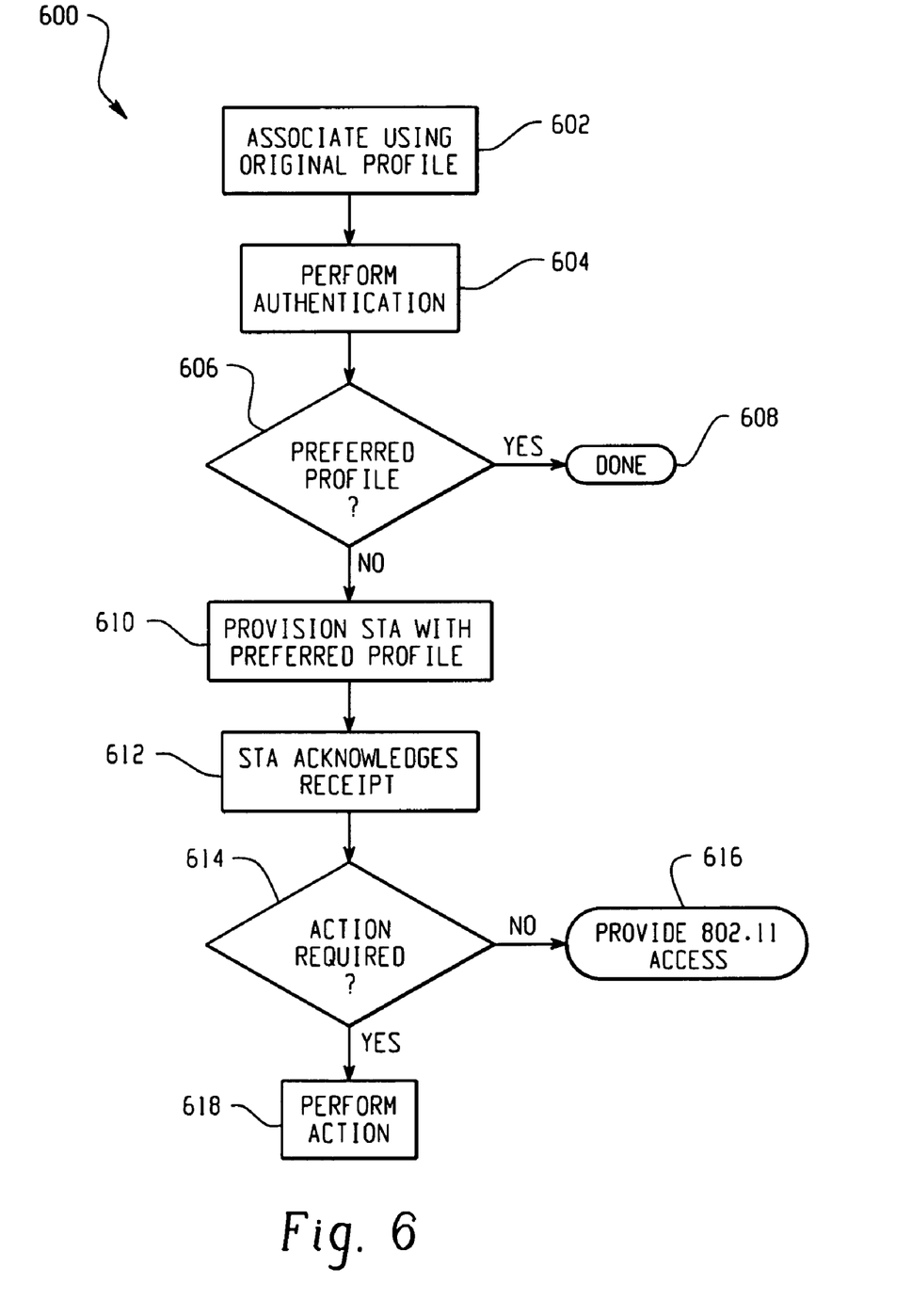
FIG. 6 is a block diagram of a third methodology in accordance with an aspect of the present invention.
Figure 7:
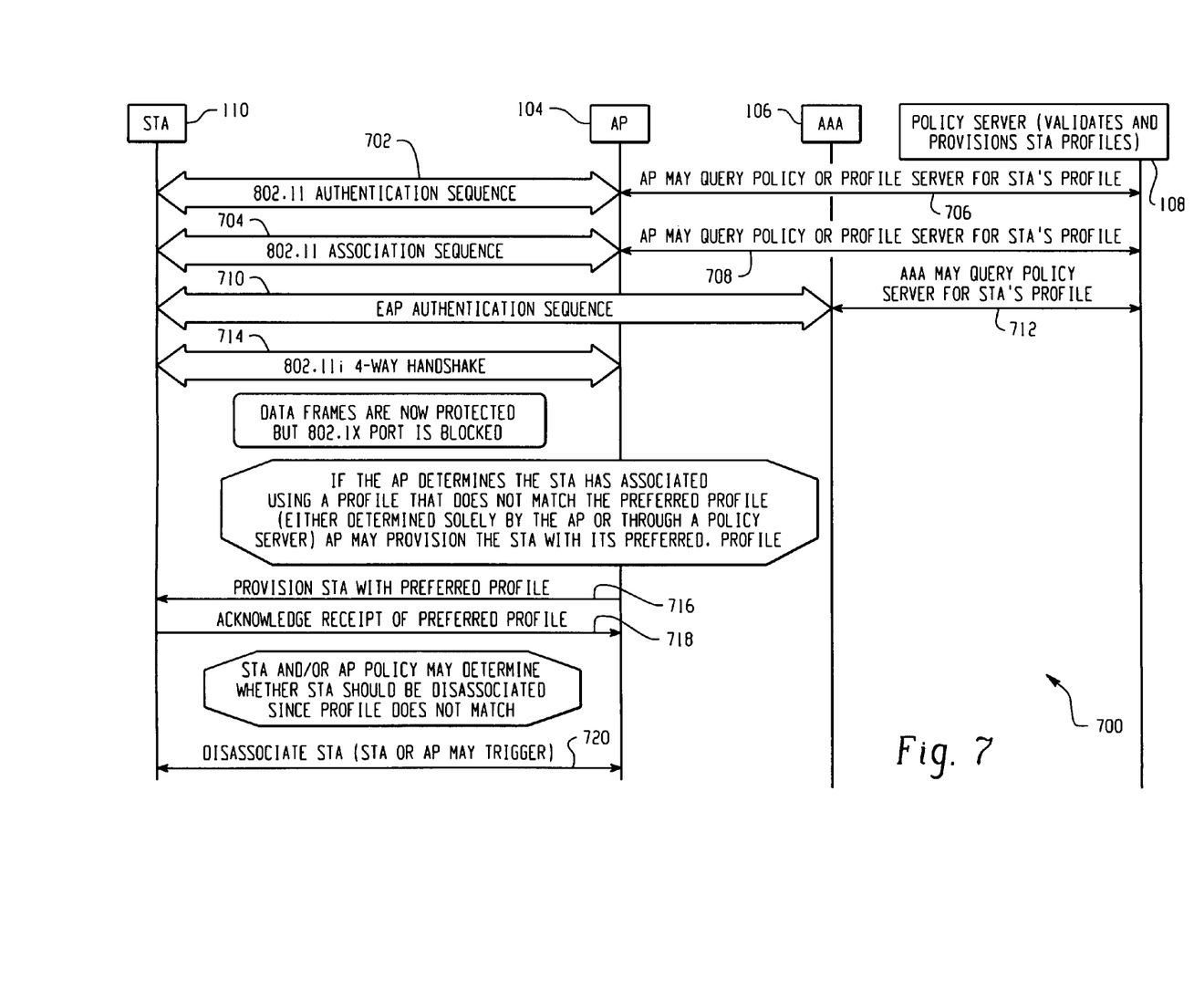
FIG. 7 is a flow diagram illustrating signaling for a system implementing the third methodology.

FIG. 6 is a block diagram 600 of a third methodology in accordance with an aspect of the present invention. FIG. 7 is a signal diagram 700 for a system implementing the third methodology. Methodology 600 performs dynamic provisioning after a secure association. STA 110 and AP 104 will have an existing security association and keys to protect the traffic between them. Methodology 600 is similar to methodology 200, except all exchanges are protected with link layer keys. Since the provisioning exchanges are Layer 2 frames, they are protected using the existing keys used to protect the 802.11 data link, so the authenticity of the source of the profiles can be verified to make sure the provisioning and command to switch is not from a rogue AP.

Once the client associates with the AP using the provisioned profile, it will start a new association. An action code or other signal sent along the alternate profile can be used to signal how to handle keying. For example, if the Action Code value is "1", the PMK (Pairwise Master Key) cached by the AP and can be reused, then client can keep use the old PMK to derive the new PTK (Pairwise Transient Key), for example either thru 802.11i or 802.1x complaint keying. No new EAP authentication is needed. As another example, if the Action code value is "2", the existing PMK will be deleted, and the client has to perform a new EAP authentication to derive the new PMK.

At 602, STA 110 associates with AP 104. STA 110 associates with a current (first) profile. Authentication sequences 702, 704 are between STA 110 and AP 104. Responsive to authentication sequences 702, 704, AP 104 may query PPS 108 for a preferred profile for STA 110 as shown by 706, 708 respectively. Alternatively, AP 104 may store profiles locally and query locally stored profiles. At 604 STA 110 is authenticated (e.g. an EAP authentication) by AAA server 106 as shown by 710. AAA server 106 may query PPS server 108 for STA 110's profile as shown at 712. At 714, a key exchange is used to establish session keys between AP 104 and STA 110 (for example an IEEE 802.11i complaint key exchange can be performed). At the conclusion of the key exchange, data fames are protected, even if the 802.1x (controlled) port is blocked.

At 606, AP 104 determines whether STA 110 is using the preferred profile. If STA 110 is using the preferred profile (YES) then no further action is necessary and the process stops at 608. If at 606 AP 104 determines that STA 110 does not have the preferred profile (NO) then at 610 STA 110 is provisioned with the preferred (alternate) profile as shown by 716. At 612 STA 110 acknowledges receipt of the preferred profile as shown by 718. At 614, either STA 110 or AP 104 determines whether STA 110 or AP needs to take any additional action. For example, AP 104 can determine whether STA 110 can remain associated with the current profile or should re-associate with the preferred profile. Similarly, STA 110 can determine whether it needs to take additional action, such as a re-boot or associate with another AP (not shown) to activate the preferred (alternate) profile. If addition action is desired (YES), at 618 STA 110 (or AP 104) performs the additional action (e.g. STA 110 is deautheniticated/disassociated as shown by 720); otherwise, (NO), method 600 stops at 616.

Figure 8:
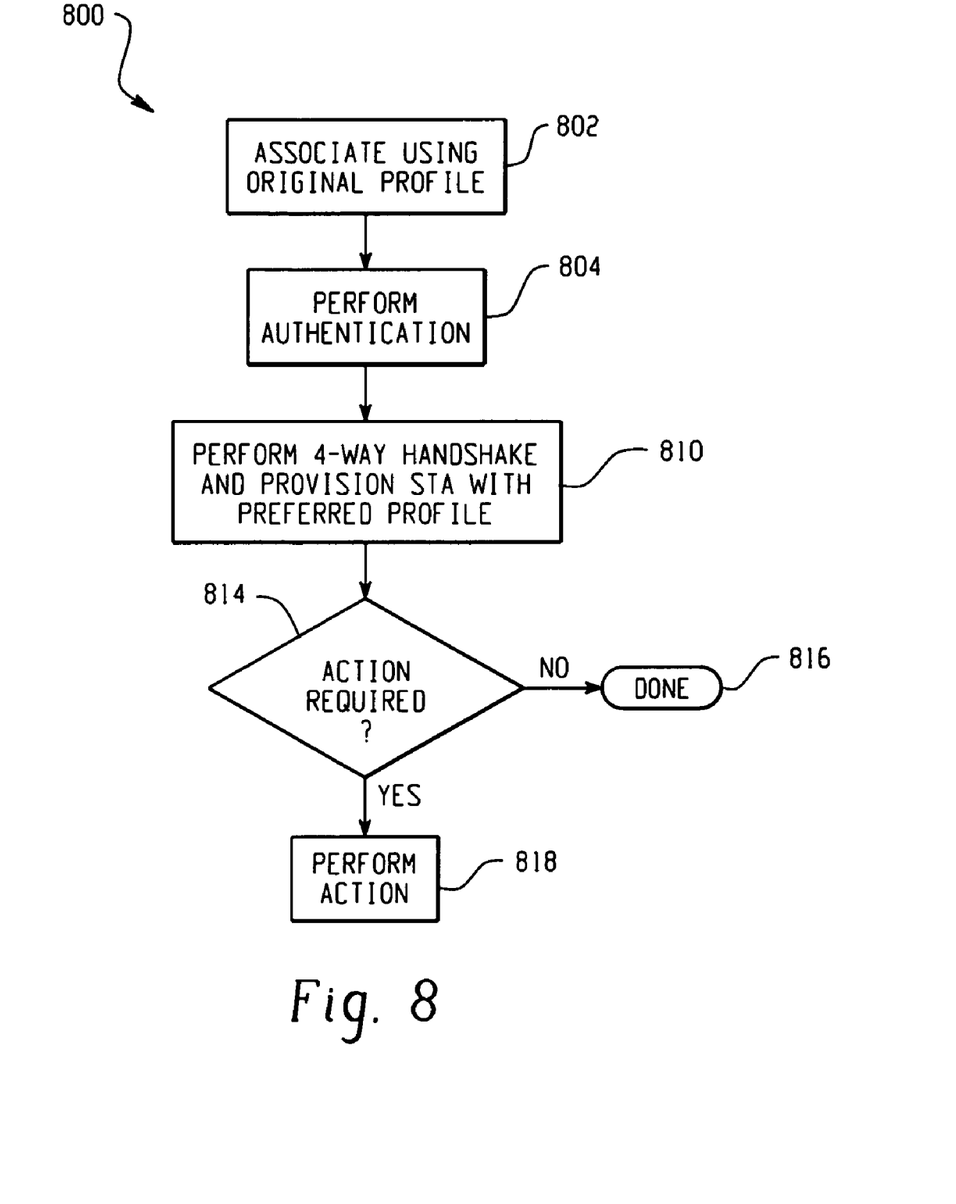
FIG. 8 is a block diagram of a fourth methodology in accordance with an aspect of the present invention.
Figure 9:
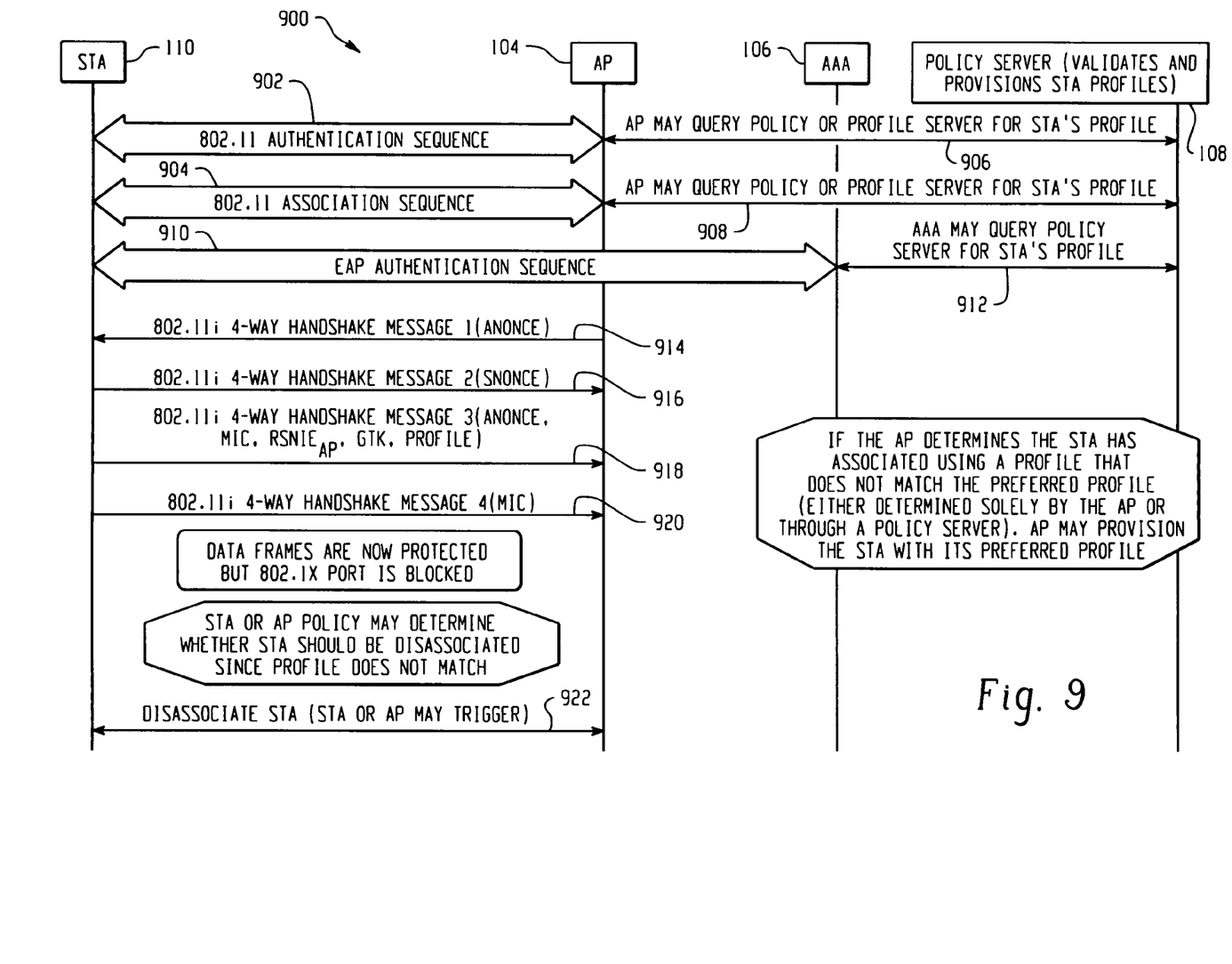
FIG. 9 is a flow diagram illustrating signaling for a system implementing the fourth methodology.

FIG. 8 is a block diagram of a fourth methodology 800 in accordance with an aspect of the present invention. FIG. 9 is a flow diagram 900 illustrating signaling for a system implementing the fourth methodology. Methodology 800 optimizes provisioning during establishment of a secure association using an 802.11i complaint protocol.

After the wireless client has been EAP authenticated and/or posture validated, the AAA server will assign an appropriate access policy for the client and send it to the AP, along with the Master Session Key (MSK) resulting from a successful EAP authentication. Note that the resulting MSK (Master Session Key) is used as the PMK for 802.11i or NSK (Network Session Key) for Cisco Central Key Management (CCKM). Alternately, if (Pre-shared Key) PSK is used, the PSK may be used as the PMK.

If the AP determines (either solely or thru PPS) that a new wireless network profile is needed for the client, instead of disassociating the client right away and force it to try a different network blindly, the AP continues with the normal IEEE 802.11i four-way handshake, by completing the EAP authentication and initiating the first message of the four-way handshake. The four-way handshake is invoked using the negotiated capabilities of the current association. It should be noted that at this point, the client is not aware of a potential Layer 2 session rejection, other than potential result codes from the EAP conversation.

Client will finish the EAP exchange and respond with 4-way handshake MSG2 as normal. So far, the client has no idea of the profile switching and proceeds with normal 802.11i handshake. At the end of MSG2, the client asserts possession of the PMK and liveness of the PTK by including its SNonce and authenticating the packet using the KCK (Key Confirmation Key) portion of the PTK.

Rather than proceeding in the normal 4-way handshake and sending the GTK, the AP provides the required profile information and status action code in the key data field; depending on AP policy, it may still distribute the group temporal key (GTK). The profile information is comprised of the 802.11 information elements as required for a client to successfully authenticate as well as a new Cisco AP Policy key data encapsulation (KDE) that provides the status action code signaling the client the AP's pending action. Once the client receives MSG3 and validates MSG3, it retrieves the new network profile and determines the AP's intention based on the new Cisco AP Policy KDE. It sends back MSG4 as an acknowledgment. The contents of MSG4 remains the same as the normal 802.11i handshake.

After transmitting MSG4 client applies the profile immediately if it has been instructed so. It may choose to immediately (re)associate with the same AP or different AP using the provisioned profile. Note that the client need not wait for the AP to send a disassociation request if the pending action defines such an action.

An example of methodology 800 is illustrated in FIGS. 8 and 9. At 802, STA 110 associates with AP 104. STA 110 associates with a current (first) profile. Authentication sequences 902, 904 are between STA 110 and AP 104. Responsive to authentication sequences 902, 904, AP 104 may query PPS 108 for a preferred profile for STA 110 as shown by 906, 908 respectively. Alternatively, AP 104 may store profiles locally and query locally stored profiles.

At 804 STA 110 is authenticated (e.g. an EAP authentication) by AAA server 106 as shown by 910. AAA server 106 may query PPS server 108 for STA 110's profile as shown at 912.

At 810 an 802.11i complaint 4-way key handshake is used to establish keys and provision STA 110 with the alternate (preferred) profile. At 914, an 802.11i complaint Message 1 is sent from AP 104 to STA 110 comprising an Anonce. At 916, STA 110 responds with an 802.11i complaint 4 way handshake message 2, which comprises a Snonce. At 918, AP 104 responds with an 802.11i complaint message 3, which comprises an anonce, MIC (message integrity check), RSNIE (Robust Security Network Information Element), GTK (group transient key) and the alternate profile. At 920, STA 110 replies with an 802.11i 4 way handshake message 4 that comprises a MIC. At the conclusion of the 802.11i compatible 4 way handshake, data fames are protected, even if the 802.1x (controlled) port is blocked.

At 814, either STA 110 or AP 104 determines whether STA 110 or AP 104 needs to take any additional action. For example, AP 104 can determine whether STA 110 can remain associated with the current profile or if STA 110 should re-associate and/or re-authenticate with the preferred (alternate) profile. If readditional action -association is desired (YES), at 818 STA 110 or AP 104 performs the additional action (for example STA 110 is deautheniticated/disassociated as shown at 922); otherwise (NO), method 800 stops at 816.

In accordance with an aspect of the present invention, STA 110 (or AP 104) may choose to deauthenticate/disassociate after the alternate profile has been provisioned as illustrated in FIGS. 2-9. It is not necessary that STA 110 associates with the same AP (e.g. AP 104). For example, if a BSSID is specified in the alternate profile, STA 110 may scan to join the BSSID specified in the alternate profile. If an SSID is specified in the alternate profile, STA 110 may scan to join the SSID specified in the alternate profile. Moreover, STA 110 may choose a BSSID or SSID that best fits the remaining set of parameters (e.g. radio (RF) specifications, security specifications, QoS specifications, etc.) if neither a BSSID nor SSID is provided.

In accordance with an aspect of the present invention, the methodologies described in FIGS. 2-9 may be performed as often as desired. For example, any time an updated profile (or profiles) becomes available, the appropriate methodology can be used to provision the updated profile to STA 110.

Figure 10:
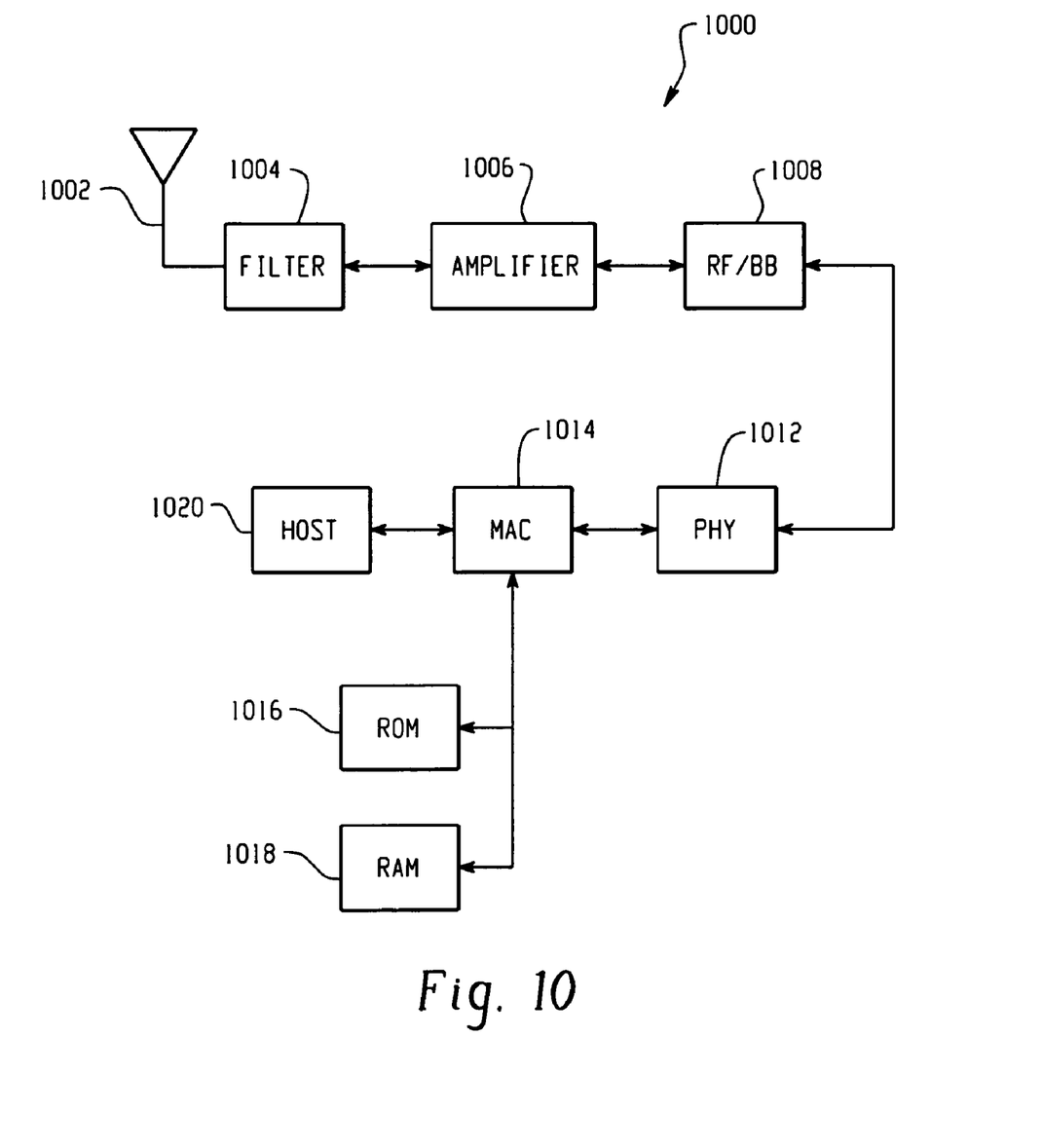
FIG. 10 is a block diagram of a wireless transceiver for implementing an aspect of the present invention.

Referring to FIG. 10, there is illustrated a block diagram of a wireless transceiver 1000 suitable for implementing an aspect of the present invention. For example, wireless transceiver 1000 is suitably adapted to perform the functionality required for STA 110 and/or AP 104. Wireless transceiver 1000 comprises an antenna 1002 for sending and receiving wireless signals. Filter 1004 filters signals to/from antenna 1002. Preferably, filter 1004 is a bandpass filter. Amplifier 1006, which can be a low noise amplifier, amplifies signals to/from filter 1004. Wireless frequency (e.g. Radio Frequency) to Baseband (RF/BB) converter 1008 converts RF signals to/from amplifier 1006 and PHY 1012. RF/BB converter 1008 may suitably comprise additional Intermediate Frequency Stages (e.g., RF/IF and IF/BB). Physical Layer processor (PHY) 1012 is coupled to D/A A1D 1010. Media Access Controller (MAC) 1014 is coupled to PHY 1012. Read Only Memory (ROM) 1016 and Random Access Memory (RAM) 1018 are associated with MAC 1014. Transceiver 10 may further comprise additional filters (not shown) e.g. bandpass and/or baseband filters and amplifiers (Not shown), e.g. a Low Noise Amplifier (LNA) or Power Amplifier (PA) as desired; however, these additional filters are not necessary for understanding aspects of the present invention.

PHY 1012 is a physical layer (PHY) processing device (e.g., a modem or digital signal processor). PHY 1012 typically performs digital signal processing, such as analog-to-digital and digital-to-analog conversion, and encoding/decoding of waveforms (modulation/demodulation). The digital signal processing can be done with general purpose digital signal processing integrated circuits, or in specially designed digital logic. In either case, PHY 1012 is modulating/demodulating data to be compatible with the appropriate communication standard. For example, in IEEE 802.11a this involves OFDM, while in IEEE 802.11b it involves Direct Sequence Spread Spectrum (DSSS). On one side of PHY 1012, data is exchanged with MAC 1014, while on the other side of PHY 1012, it is exchanged with RF/BB 1008. PHY 1012 typically includes analog-to-digital (A/D) converters for data received from RF/BB 1008, and digital-to-analog (D/A) converters for data transmitted to RF/BB 1008.

MAC 1014 is a Medium Access Control (MAC) processing system, In a preferred and/or alternative embodiment the MAC processing system includes a MAC processor (e.g., an embedded processor) which is a multi-functional processor engine responsible for a variety of different processing tasks associated with the wireless communications. RAM 1018 is used by MAC 1014 to store data going to and from PHY 1012. MAC 1014 can act upon the data, for example, by encrypting or decrypting it, or by interpreting the data and making decisions as to how and when to forward it.

In operation, signals received by antenna 1002 are filtered by filter 1004. Amplifier 1006 amplifies the signal and RF/BB converter 1008 converts the frequency from its wireless (e.g. RF) frequency to a baseband (or other suitable) frequency. The baseband signal is then processed by PHY 1012 which may perform one or more of converting the signal from analog to digital, demodulating and decoding. The signal processed by PHY 1012 is forwarded to MAC 1014 for further processing.

A signal to be transmitted by wireless transceiver 10 is processed by MAC 1014. For example MAC 1014 may encrypt the signal. The signal may be stored at RAM 1018 for future transmission or immediately forwarded to PHY 1012. PHY 1012 then performs one or more of encoding, modulating, and converting from digital to analog. The signal from PHY 1012 is then sent to RF/BB converter 1008 which converts the signal to the appropriate wireless frequency. Amplifier 1006 amplifies the signal, which is then passed through filter 1004 and to antenna 1002 for transmission.

Host 1020 comprises logic or one ore more processors for performing one or more of the methodologies described herein. "Logic", as used herein, includes but is not limited to hardware, firmware, sofware and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Figure 11:
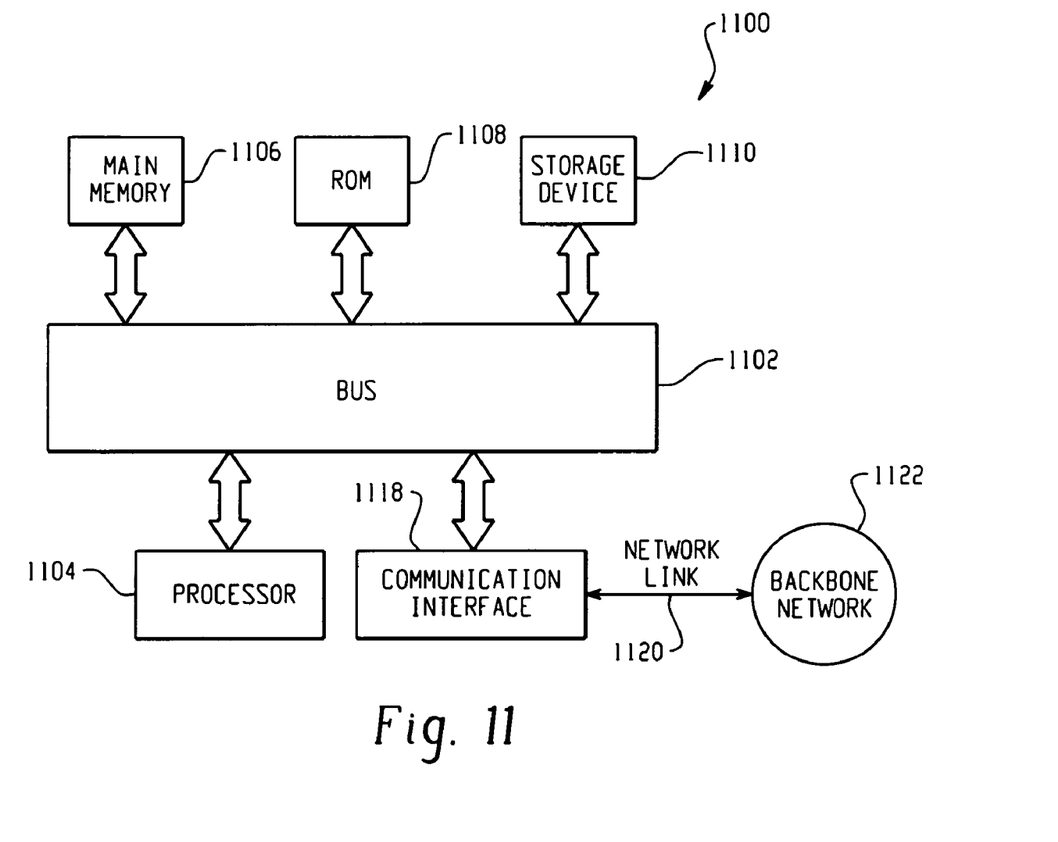
FIG. 11 is a block diagram of a computer system for implementing an aspect of the present invention.

FIG. 11 is a block diagram that illustrates a computer system 1100 upon which an embodiment of the invention may be implemented. Computer system 1100 is suitable for implementing the methodologies described in FIGS. 2-9 herein, and may be used in the implementation of STA 110, AP 104, AAA server 106 and/or PPS server 108.

Computer system 1100 includes a bus 1102 or other communication mechanism for communicating information and a processor 1104 coupled with bus 1102 for processing information. Computer system 1100 also includes a main memory 1106, such as random access memory (RAM) or other dynamic storage device coupled to bus 1102 for storing information and instructions to be executed by processor 1104. Main memory 1106 also may be used for storing a temporary variable or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

An aspect of the invention is related to the use of computer system 1100 for WLAN Profile Provisioning. According to one embodiment of the invention, WLAN Profile Provisioning is provided by computer system 1100 in response to processor 1104 executing one or more sequences of one or more instructions contained in main memory 1106. Such instructions may be read into main memory 1106 from another computer-readable medium, such as storage device 1110. Execution of the sequence of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to non-volatile media, volatile media, and transmission media. Non-volatile media include for example optical or magnetic disks, such as storage device 1110. Volatile media include dynamic memory such as main memory 1106. Transmission media include coaxial cables, copper wire and fiber optics, including the wires that comprise bus 1102. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASH-PROM, any other memory chip or cartridge, a carrier wave as described hereinafter, or any other medium from which a computer can read.

Various forms of computer-readable media may be involved in carrying one or more sequences of one or more instructions to processor 1104 for execution. For example, the instructions may initially be borne on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106 from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a distribution (backbone) network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information. Network link 1120 typically provides data communication through one or more networks to other data devices. For example, network link 1120 may provide a connection between AP 104, AAA server 106 and/or PPS server 108.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for providing a Wireless Local Area Network (WLAN) client profile, comprising:
    associating the WLAN client with an access point, the client having a current profile;
    authenticating the client with the access point;
    determining that the current profile does not match a preferred profile; and
    establishing a key to protect packets between the access point and the client and providing an alternate profile to the WLAN client in accordance with the determining that the current profile does not match the preferred profile, by piggybacking IEEE 802.11i compatible four way handshake protocol, the four way handshake protocol comprising:
        receiving by the WLAN client an anonce,
        sending by the WLAN client a snonce and standard IEEE 802.11i security parameters to the access point responsive to receiving the anonce,
        receiving by the WLAN client in a $3^{rd}$ message of the four way handshake, a second IEEE 802.11i security parameter with the alternate profile after sending the snonce, and
        sending by the WLAN client an acknowledgement confirming receipt of the alternate profile responsive to receiving the alternate profile;
    wherein the alternate profile is the preferred profile.

2. A method according to claim 1, further comprising deauthenticating the client.

3. A method according to claim 1, wherein the alternate profile comprises one of the group consisting of a basic service set identifier (BSSID), radio channels, minimum transmit power, maximum transmit power, service set identifier (SSID), unicast cipher, broadcast cipher, Extensible Authentication Protocol type, Quality of Service profile and traffic specification priorities.

4. A method according to claim 3, further comprising scanning for a best access point for the alternate profile.

5. A method according to claim 1, further comprising controlling traffic between the client and the access point responsive to determining the current profile is not the preferred profile, wherein only association packets are forwarded by the access point and non-association packets are blocked by the access point until the client associates with the alternate profile.

6. A method according to claim 1, further comprising:
    provisioning the client with multiple alternate profiles and data representative of an alternate profile to be used next by the client; and
    receiving an acknowledgement from the client verifying receipt of the multiple alternate profiles.

7. A method according to claim 1, further comprising:
    reassociating using the alternate profile;
    deriving a new key based on the current key.

8. A method according to claim 1, further comprising:
    the establishing a key further includes establishing a pairwise master key;
    receiving a signal with data indicative of instructions for keying;
    reassociating using the alternate profile;
    deriving a new key based on the pairwise master key responsive to the data indicative of instructions for keying having a first value; and
    performing a new authentication to derive a new pairwise master key responsive to the data indicative of instructions for keying having a second value.

9. The method of claim 1, wherein the alternate profile is received in a group temporal key data field.

10. A system, comprising:
- a wireless client having a current profile;
- an access point operable for wirelessly communicating with the wireless client;
- an authentication server coupled with the access point by a distribution network operable for authenticating the wireless client for the access point; and
- a profile policy server coupled to the access point by the distribution network and operable to provide the access point with data representative of profile data for the wireless client;
- wherein the access point is responsive to associating the client with the current profile;
- wherein the access point is responsive to communicate with the authentication server to optionally authenticate the wireless client;
- wherein the access point is responsive to communicate with the profile policy server and operable to determine whether the current profile is a preferred profile;
- wherein, responsive to determining the current profile is not the preferred profile, the access point is responsive to receiving an alternate profile from the profile policy server to send the alternate profile to the wireless client during a four way handshake to establish a key with the client;
- wherein the access point sends the alternate profile in a third message during the four way handshake;
- wherein the access point is responsive to receive an acknowledgement from the client verifying receipt of the alternate profile responsive to sending the alternate profile;
- wherein the access point initiates a reassociation with the client using the alternate profile responsive to receiving the acknowledgement from the client verifying receipt of the alternate profile; and
- wherein the alternate profile is the preferred profile.

11. A system according to claim 10, wherein the access point is operable to deauthenticating the client responsive to receiving the acknowledgement.

12. A system according to claim 10, wherein the access point is operable to controlling traffic between the client and the access point responsive to determining the current profile is not the preferred profile, wherein only association packets are forwarded by the access point and non-association packets are blocked by the access point until the client associates with the alternate profile.

13. A system according to claim 10, further comprising the access point operable to provisioning the client with a second alternate profile and receiving an acknowledgement from the client verifying receipt of the second alternate profile.

14. A system according to claim 10, further comprising:
- wherein the access point is operable to authenticating the client with the authentication server; and
- wherein the four way handshake is an IEEE 802.11i compatible four way handshake, the four way handshake protocol comprising
    - the access point operable to sending a anonce to the client,
    - the access point responsive to receiving from the client a snonce from the client,
    - the access point operable to sending security parameters and the alternate profile to the client, and
    - the access point is responsive to receiving an acknowledgement from the client verifying receipt of the alternate profile.

15. A system according to claim 10, wherein the alternate profile includes one of the group consisting of basic service set identifier, radio channels, minimum transmit power, maximum transmit power, service set identifier, unicast cipher, broadcast cipher, Extensible Authentication Protocol type, Quality of Service profile and traffic specification priorities.

16. A system according to claim 10, wherein the profile server is co-located with one of the group consisting of the authentication server and the access point.

17. An access point comprising:
- a wireless transceiver operable to sending and receiving wireless signals;
- means for associating with a client coupled to the wireless transceiver, the client having an current profile;
- means for determining whether the current profile is a preferred profile;
- means for selectively provisioning the client with an alternate profile coupled to the wireless transceiver responsive to determining the current profile is not the preferred profile, wherein the means for provisioning further comprises means for establishing a key with the client, the means for establishing employing a four way handshake to establish the key in a third message of the four way handshake, and the means for provisioning sending the preferred profile to the client in the third message while performing the four way handshake; and
- means for receiving an acknowledgement from the client verifying receipt of the alternate profile coupled to the wireless transceiver responsive to provisioning the client with the alternate profile;
- means for disassociating with the client responsive to the means for receiving acknowledgement;
- means for re-associating with the client, the client using the alternate profile responsive to the means for re-associating;
- wherein the alternate profile is the preferred profile; and
- wherein the alternate profile includes one of the group consisting of basic service set identifier, radio channels, minimum transmit power, maximum transmit power, service set identifier, unicast cipher, broadcast cipher, Extensible Authentication Protocol type, Quality of Service profile and traffic specification priorities.

18. An access point according to claim 17, further comprising means for controlling traffic between the client and the access point coupled to the wireless transceiver responsive to determining current profile is not the preferred profile, wherein only association packets are forwarded by the access point and non-association packets are blocked by the access point until the client associates with the alternate profile.

19. An access point according to claim 17, further comprising:
- means for provisioning the client with a second alternate profile coupled to the wireless transceiver; and
- means for receiving an acknowledgement from the client verifying receipt of the second alternate profile coupled to the wireless transceiver.

20. An access point according to claim 17, the means for establishing comprising
- means for sending an anonce to the client via a first message of the four way handshake,
- means for receiving an snonce from the client via a second message of the four way handshake;
- means for verifying the snonce and hashed security credential;
- means for sending security parameters and the alternate profile to the client by the access point via a third message of the four way handshake, and
- means for receiving an acknowledgement from the client via a fourth message of the four way handshake.

* * * * *